US007018423B2

United States Patent
Deak et al.

(10) Patent No.: US 7,018,423 B2
(45) Date of Patent: Mar. 28, 2006

(54) METHOD FOR THE USE OF AQUEOUS VAPOR AND LIPOPHILIC FLUID DURING FABRIC CLEANING

(75) Inventors: John Christopher Deak, West Chester, OH (US); Paul Amaat France, West Chester, OH (US); Wilburt Thomas Woods, Cincinnati, OH (US); Anna Vadimovna Noyes, Hamilton, OH (US); Linda-Carol McWilliams, Cincinnati, OH (US); Michael Jason Ullom, Mason, OH (US)

(73) Assignee: Procter & Gamble Company, Cincinnati, OH (US)

( * ) Notice: Subject to any disclaimer, the term of this patent is extended or adjusted under 35 U.S.C. 154(b) by 693 days.

(21) Appl. No.: 09/849,555

(22) Filed: May 4, 2001

(65) Prior Publication Data

US 2002/0010964 A1 Jan. 31, 2002

Related U.S. Application Data

(60) Provisional application No. 60/280,029, filed on Mar. 30, 2001, provisional application No. 60/247,531, filed on Nov. 9, 2000, provisional application No. 60/209,444, filed on Jun. 5, 2000, provisional application No. 60/209,443, filed on Jun. 5, 2000, provisional application No. 60/209,250, filed on Jun. 5, 2000, provisional application No. 60/209,468, filed on Jun. 5, 2000.

(51) Int. Cl.
D06L 1/02 (2006.01)
D06L 1/04 (2006.01)
F26B 11/02 (2006.01)

(52) U.S. Cl. .................. 8/137; 8/142; 8/149.2; 8/159; 510/276; 510/285; 510/511; 134/34

(58) Field of Classification Search .............. 8/142, 8/137, 159, 149.2; 510/285–7, 276, 511; 252/174; 134/34

See application file for complete search history.

(56) References Cited

U.S. PATENT DOCUMENTS

| | | | |
|---|---|---|---|
| 3,635,667 A | | 1/1972 | Keay et al. |
| 3,663,160 A | | 5/1972 | Stone et al. |
| 3,854,871 A | | 12/1974 | Eanzel et al. |
| 4,077,770 A | | 3/1978 | Rouvellat et al. |
| 4,111,034 A | | 9/1978 | Hubner |
| 4,137,044 A | | 1/1979 | Flower et al. |
| 4,207,072 A | | 6/1980 | Schuierer et al. |
| 4,536,978 A | * | 8/1985 | Cerutti ..................... 38/103 |
| 4,639,321 A | | 1/1987 | Barrat et al. |
| 4,685,930 A | | 8/1987 | Kasprzak |
| 4,761,896 A | | 8/1988 | Miyata |
| 5,046,337 A | | 9/1991 | Ro et al. |
| 5,057,240 A | * | 10/1991 | Madore et al. ........... 510/328 |
| 5,940,988 A | * | 8/1999 | Eisen ...................... 34/596 |
| 5,942,007 A | | 8/1999 | Berndt et al. |
| 6,063,135 A | * | 5/2000 | Berndt et al. .............. 8/142 |
| 6,194,375 B1 | * | 2/2001 | Ness et al. ................. 512/4 |
| 6,258,130 B1 | | 7/2001 | Murphy |
| 6,273,919 B1 | | 8/2001 | Hayday |
| 6,309,425 B1 | | 10/2001 | Murphy |
| 6,310,029 B1 | | 10/2001 | Kilgour et al. |
| 6,313,079 B1 | | 11/2001 | Murphy et al. |
| 6,368,359 B1 | | 4/2002 | Perry et al. |
| 2001/0020308 A1 | | 9/2001 | Murphy |
| 2001/0034912 A1 | | 11/2001 | Kilgour et al. |
| 2002/0004953 A1 | | 1/2002 | Perry et al. |
| 2002/0115582 A1 | | 8/2002 | Perry et al. |
| 2002/0174493 A1 | | 11/2002 | Perry et al. |

FOREIGN PATENT DOCUMENTS

| | | |
|---|---|---|
| DE | 2108 991 | 8/1972 |
| DE | 4131589 A1 | 5/1986 |
| DE | 3739711 A | 6/1989 |
| DE | 296 00 628 U1 | 6/1997 |
| EP | 1 451 600 A | 10/1976 |
| EP | 0 118 625 A2 | 9/1984 |
| EP | 0182583 A2 | 5/1986 |

(Continued)

Primary Examiner—Yogendra N. Gupta
Assistant Examiner—Preeti Kumar
(74) Attorney, Agent, or Firm—Caroline Wei-Berk; Kim W. Zerby; Steve W. Miller

(57) ABSTRACT

The present invention relates to methods to achieve improved cleaning of both wet washable and dry cleanable fabrics. The present invention is carried out by exposing the fabrics to an aqueous vapor and a lipophilic fluid, optionally, but preferably followed by an extraction of both.

30 Claims, No Drawings

FOREIGN PATENT DOCUMENTS

| | | |
|---|---|---|
| EP | 0410 068 A1 | 1/1991 |
| EP | 0 422 787 A2 | 4/1991 |
| EP | 0 566 240 A1 | 10/1993 |
| EP | 0 679 754 A2 | 11/1995 |
| EP | 0 716 870 A1 | 6/1996 |
| EP | 0 767 267 A1 | 4/1997 |
| EP | 0 962519 A1 | 12/1999 |
| EP | 982 023 A2 | 3/2000 |
| EP | 1 043 443 A1 | 10/2000 |
| GB | 2 084 204 A | 4/1982 |
| GB | 2 230 022 A | 10/1990 |
| GB | 2 251 867 A | 7/1992 |
| WO | WO 82/02218 A1 | 7/1982 |
| WO | WO 94/01227 A1 | 1/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 01/94678 A1 | 12/2001 |
| WO | WO 01/94681 A1 | 12/2001 |
| WO | WO 01/94684 A1 | 12/2001 |

\* cited by examiner

METHOD FOR THE USE OF AQUEOUS VAPOR AND LIPOPHILIC FLUID DURING FABRIC CLEANING

RELATED APPLICATIONS

This application claims priority under 35 U.S.C. § 119(e) to U.S. Provisional Application Ser. Nos. 60/209,468, 60/209,250, 60/209,443 and 60/209,444 all of which were filed on Jun. 5, 2000, and under 35 U.S.C. § 119(e) to U.S. Provisional Application Ser. No. 60/247,531 filed on Nov. 9, 2000.

FIELD OF THE INVENTION

The present invention relates to methods to achieve improved cleaning and/or wrinkle reduction and/or wrinkle removal and/or perfuming of both wet washable and dry cleanable fabrics. The present invention is carried out by exposing the fabrics to an aqueous vapor and a lipophilic fluid.

BACKGROUND OF THE INVENTION

Conventional laundering techniques for the cleaning and treatment of fabric articles such as garments have long involved both traditional aqueous based washing and a technique commonly referred to as "dry cleaning". Traditional aqueous based washing techniques have involved immersion of the fabric articles in a solution of water and detergent or soap products followed by rinsing and drying. However, such conventional immersion cleaning techniques have proven unsatisfactory on a wide range fabric articles that require special handling and/or cleaning methods due to fabric content, construction, etceteras, that is unsuitable for immersion in water.

Accordingly, the use of the laundering method of "dry cleaning" has been developed. Dry cleaning typically involves the use of non-aqueous, lipophilic fluids as the solvent or solution for cleaning. While the absence of water permits the cleaning of fabrics without the potential disastrous side effects water may present, these lipophilic fluids do not perform well on hydrophilic and/or combination soils.

Because lipophilic fluids typically clean hydrophobic stains, hydrophilic and combination stain cleaning is typically not achieved to a desirable level. It would be desirable to include an aqueous vapor step in the dry cleaning process in order to extend the soil removal performance of the dry cleaning process while still limiting the disastrous effects aqueous solutions can have on so-called "dry clean only fabrics."

Accordingly, the need remains for a dry cleaning method including an aqueous vapor application step that is safe for a wide range of fabrics.

SUMMARY OF THE INVENTION

This need is met by the present invention wherein an aqueous vapor application step is provided during a fabric cleaning cycle.

In one embodiment, the present invention provides a method for improved cleaning of fabrics within one apparatus comprising the steps of exposing said fabrics to an effective amount of an aqueous vapor preferably at least about 0.5% but less than or equal to about 50% by weight of said fabrics such that the fabrics are cleaned better than in the absence of the aqueous vapor, exposing said fabrics to a lipophilic fluid, and optionally, but preferably extracting at least a portion of said lipophilic fluid.

In another embodiment, the present invention provides a method for reducing and/or removing wrinkles in a fabric article in need of treatment comprising exposing the fabric article to an effective amount of an aqueous vapor such that wrinkles in the fabric article are reduced and/or removed, and exposing the fabric article to a lipophilic fluid, and optionally, but preferably extracting at least a portion of the lipophilic fluid. Preferably the method is carried out in one apparatus.

In yet another embodiment, the present invention provides a method for applying a perfume to a fabric article in need of treatment comprising exposing the fabric article to an effective amount of an aqueous vapor comprising a perfume, preferably at a level within the aqueous vapor of from about 200 ppm to about 3000 ppm, more preferably from about 500 ppm to about 2000 ppm, even more preferably from about 700 ppm to about 1400 ppm, such that the perfume is deposited onto the fabric article, and exposing the fabric article to a lipophilic fluid, and optionally, but preferably removing at least a portion of the lipophilic fluid. Preferably, the method is carried out in one apparatus.

The steps of exposing the fabric article to aqueous vapor and a lipophilic fluid may occur in any order, preferably the fabric article is exposed to the aqueous vapor prior to being exposed to the lipophilic fluid.

These and other aspects, features and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are in relevant part, incorporated herein by reference.

DETAILED DESCRIPTION OF THE INVENTION

Definitions

The term "fabrics" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "wet washable fabrics" used herein is intended to mean those fabrics which can be cleaned or treated by a conventional aqueous based wash method whereas "dry cleanable fabrics" used herein is intended to mean those fabrics for which the manufacturer recommends dry cleaning or those fabrics that may suffer damage (shrinkage, dye bleeding, fading, etceteras) if cleaned or treated by a conventional aqueous based wash method.

The term "aqueous vapor" used herein is intended to mean any vapor, droplets, mist, fog, or atomized liquid that is water based. If the aqueous vapor is steam or superheated steam (above atmospheric pressure), it is preferable that it is a "wet" steam or a steam having a "low quality" in the normal meaning of these terms in the steam production art. "Cold steam" is also encompassed by this term. Cold steam may be produced by exposing water or a water-based compositions to ultrasonic waves in order to effect vaporization. For all aqueous vapor types, it is preferable that the size of the droplets is less than 1 millimeter, more preferably, less than 250 microns, and most preferably, less than 100 microns.

The term "cleaning chamber" used herein is intended to mean any chamber, cylinder, and the like wherein some fabric cleaning takes place. This may include the "drum" in a domestic clothes washing machine, the "drum" within a commercial dry cleaning machine, or a similar structure within an apparatus specially designed or modified to carry out the objects of the present invention.

The term "extracting" or "extraction" used herein is meant to include all methods whereby fluids and/or liquids are removed from the fabrics. Spinning the fabric load, including the lipophilic fluid and the aqueous phase, is well known in conventional laundry applications. Wringing or twisting or squeezing the treated fabrics is also a well-known mechanical way to extract fluids from fabrics and fabric articles. Evaporation may also be employed to extract the lipophilic fluid and aqueous phase and/or to dry the fabric load. Heating the fabric load, lipophilic fluid and aqueous phase or other well-known means for evaporation may do this. Spinning or tumbling may be coupled with heating to assist evaporation and evaporation uniformity.

Furthermore, all adjunct ingredients such as surfactants, bleaches, and the like may be added either prior to fabric application (directly into the lipophilic fluid and/or aqueous vapor) or at some point during fabric application. These optional adjunct ingredients are also described in more detail below.

Lipophilic Fluid

The lipophilic fluid herein is one having a liquid phase present under operating conditions. In general such a fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipophilic fluid is not a compressible gas such as carbon dioxide. It is preferred that the lipophilic fluid herein be inflammable or, have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum or body soil as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines while unsuitable for use as lipophilic fluid may be present as one of many possible adjuncts present in the lipohilic fluid. Other suitable lipohilic fluids include diol solvent systems e.g., higher diols such as C6- or C8- or higher diols; organosilicon solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. It is worth noting that SF-1528 fluid is 90% cyclopentasiloxane (D5).

Depending on the nature of treatment the lipophilic fluid may be removed mechanically, evaporatively, or any combination thereof. For example, if the purpose of the treatment is to provide cleaning it will be desirable to mechanically remove from the fabric articles at least 50% of the textile treatment liquid, for example by spinning. On the other hand, if the purpose of the treatment is to deposit a conditioning agent into the fabric, the liquid is preferably removed evaporatively.

Qualification of Lipophilic Fluid—Lipophilic Fluid Test (LF Test) Any non-aqueous fluid that is both capable of meeting known requirements for a dry-cleaning fluid (e.g., flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®)) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the oil phase will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows: Column Flow @~1.5 ml/min.
    Split Vent @~250–500 ml/min.
    Septum Purge @ 1 ml/min.
Injection: HP 7673 Autosampler, 10 ul syringe, 1 ul injection
Injector Temperature: 350° C.
Detector Temperature: 380° C.
Oven Temperature Program: initial 60° C., hold 1 min.
    rate 25° C./min.
    final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid for use in the lipophilic fluid can be present in a mixture, e.g., with water, at approximately the ratio to be used in the final lipophilic fluid which will come into contact with fabric articles. Certain materials, which remove sebum, qualify for use as lipophilic fluids; for example, ethyl lactates can be quite objectionable in their tendency to dissolve buttons, and if such a material is to be used in the lipophilic fluid, it will be formulated with water and/or other solvents such that the overall mix is not substantially damaging to buttons. Other lipophilic fluids, D5 for example, meets the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135, which are herein incorporated by reference.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Adjunct Ingredients

The aqueous vapor and lipophilic fluid may comprise one or more adjunct ingredients.

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at very low, or less commonly, higher levels. Adjunct materials that are catalytic, for example enzymes, can be used in "forward" or "reverse" modes, a discovery independently useful from the specific appliances of the present invention. For example, a lipolase or other hydrolase may be used, optionally in the presence of alcohols as adjuncts, to convert fatty acids to esters, thereby increasing their solubility in the lipohilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

The lipophilic fluid compositions may comprise emulsifiers. Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifier/surfactants are commercially available.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:

a) Polyethylene oxide condensates of nonyl phenol and myristyl alcohol, such as in U.S. Pat. No. 4,685,930 Kasprzak; and b) fatty alcohol ethoxylates, R—(OCH$_2$CH$_2$)$_a$OH a=1 to 100, typically 12–40, R=hydrocarb residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013,683 Hill et al.

Suitable cationic surfactants include, but are not limited to dialkyldimethylammonium salts having the formula:

R'R"N$^+$(CH$_3$)$_2$X$^-$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.

Suitable silicone surfactants include, but are not limited to the polyalkyleneoxide polysiloxanes having a dimethyl polysiloxane hydrophobic moiety and one or more hydrophilic polyalkylene side chains and have the general formula:

R$^1$—(CH$_3$)$_2$SiO—[(CH$_3$)$_2$SiO]$_a$—[(CH3)(R$^1$)SiO]$_b$—Si(CH$_3$)$_2$—R$^1$ wherein a+b are from about 1 to about 50, preferably from about 3 to about 30, more preferably from about 10 to about 25, and each R$^1$ is the same or different and is selected from the group consisting of methyl and a poly(ethyleneoxide/propyleneoxide) copolymer group having the general formula:

—(CH$_2$)$_n$O(C$_2$H$_4$O)$_c$(C$_3$H$_6$O)$_d$R$^2$ with at least one R$^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each R$^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 5,705.562 Hill and U.S. Pat. No. 5,707,613 Hill, both of which are incorporated herein by reference.

Examples of this type of surfactants are the Silwet® surfactants which are available CK Witco, OSi Division, Danbury, Conn. Representative Silwet surfactants are as follows.

| Name | Average MW | Average a + b | Average total c |
|---|---|---|---|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group (R$^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers which provide molecular weights within these ranges. However, the number of ethyleneoxy units (—C$_2$H$_4$O) in the polyether chain (R$^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112, incorporated herein by reference.

Another suitable silicone surfactant is SF-1488, which is available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems", incorporated by reference herein. Further suitable nonionic detergent surfactants are generally disclosed in U.S. Pat. No. 3,929,678, Laughlin et al., issued Dec. 30, 1975, at column 13, line 14 through column 16, line 6, incorporated herein by reference.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners which have a fatty acyl group which has an iodine value of above 20, such as N,N-di(tallowoyl-oxyethyl)-N,N-dimethyl ammonium methylsulfate. However, it is to be understood that the term antistatic agent is not to be limited to just this subset of fabric softeners and includes all antistatic agents.

DETAILED DESCRIPTION OF THE METHOD

Although methods to produce the present invention will be described in detail, it should be understood, and one skilled in the art will recognize, that any processes and/or apparati capable of carrying out the steps of this method could be used.

Method

The performance of lipophilic fluids that provide safe and effective treatment of fabrics can be boosted by aqueous vapor. This vapor improves the cleaning, treating, or refreshing of a wide array of fabrics and soil types. Although some form of water is utilized in the process, the harm to the fabrics that is to be avoided by conventional dry cleaning methods/solvents is still substantially or fully avoided provided the levels of aqueous vapor do not exceed certain limits as described further below. Not intending to be bound by theory, the aqueous vapor may also function as a carrier and/or activator for the adjunct ingredients that are not very effective in the lipophilic fluid alone. This vapor may be added at different points and/or in different sequence in the treatment process or may be mixed with the lipophilic fluid and/or adjunct materials prior to application to the fabrics.

The present invention teaches a method for the improved cleaning of fabrics including three steps. Namely, the steps are exposing fabrics to an aqueous vapor, exposing the fabrics to a lipophilic fluid, and extracting at least a portion of the lipophilic fluid and at least a portion of the aqueous vapor. The three steps may be performed in any order and any number of times although the extraction step should be performed after at least one application of the aqueous vapor and/or at least one application of the lipophilic fluid. If the aqueous vapor was applied in the form of very small droplets (steam), the aqueous vapor will likely be extracted in a more condensed form.

The application of the aqueous vapor can optionally be achieved by "pulsing" the aqueous vapor onto the fabrics. "Pulsing" in this regard means a non-continuous application such that for a given volume of aqueous vapor, the entire application requires more than one application cycle. Each pulse can have a duration of from at least about 5 seconds to at most about 30 seconds. The aqueous vapor cycle pause time between each pulse can last for a time interval of from at least about 2 seconds, preferably at least about 5 seconds, to at most about 20 seconds, preferably at most about 10 seconds. While the aqueous vapor is pulsed, the fabrics can be tumbled or spun such that the fabrics are re-positioned to provide adequate and more uniform coverage of the aqueous vapor.

The extraction step of the present invention may be carried out in several ways. Spinning the fabric load, including the lipophilic fluid and water is well known in conventional laundry applications. Wringing or twisting or squeezing the treated fabrics is also a well-known mechanical way to extract fluids from fabrics and fabric articles. Evaporation may also be employed to extract the lipophilic fluid and water and/or to dry the fabric load. Heating the fabric load, lipophilic fluid and water or other well-known means for evaporation may do this. Tumbling may be coupled with heating to assist evaporation and evaporation uniformity.

The aqueous vapor application step of the present invention can occur at any point in the fabric cleaning cycle. Further, the present invention can include more than one aqueous vapor application step. In this regard, one optional "pre-treat" aqueous vapor application cycle can occur prior to the lipophilic fluid application step. The pre-treat cycle would wet the fabrics as well as begin to clean some soils. Another optional "post-treat" aqueous vapor application cycle can occur at some point after the lipophilic fluid application step. The post-treat cycle would further aid in soil removal as well as help reduce wrinkles in the fabrics. An optional "care" aqueous vapor application cycle can occur during and/or after the extraction step. The care cycle would mostly help to reduce wrinkles in the fabric. Lastly, a specific regimen could be developed for many different fabric loads. The regimen can include multiple aqueous vapor applications including one or more of the pre-treat, post-treat, and care cycles discussed above.

A preferred regimen may be designed for different garments, different soil types, and/or different desired end results. This can be accomplished by varying the order and/or number of each of the steps. For example, improved cleaning and reduced risk of harm to one particular fabric load can be achieved by exposing the fabric load to at least one aqueous vapor application step before exposing the load to a lipophilic fluid. Conversely, improved cleaning and reduced risk of harm to another load can be achieved by exposing the fabric load to at least one lipophilic fluid application step before exposing it to an aqueous vapor. As stated above, the regimen will be garment type, soil type, and/or end result specific.

In order to reduce the risk of harm to a wide array of fabric types, the amount of aqueous vapor applied could be limited to about 0.5% to about 50% by weight of the fabrics in each aqueous vapor exposure step. In order to reduce the risk of harm to an even wider array of fabric types, the amount of aqueous vapor applied can be limited further to about 5% to about 15% by weight of the fabrics in each aqueous vapor exposure step.

To boost cleaning performance further, the fabrics may be exposed to a surfactant and/or an emulsifier. Further, an emulsifier may act as a surfactant as discussed in the adjunct ingredients section. The fabrics can come into contact with the surfactant and/or emulsifier in many ways. For example, an emulsifier/surfactant may be placed in either the lipophilic fluid phase or in the aqueous vapor phase or both before exposing the fabrics to the different phases. The fabrics may even be exposed to the emulsifier/surfactant directly either before or after the lipophilic fluid and/or the aqueous vapor. Direct surfactant exposure on the fabrics can be achieved by many well-known means for pretreating fabrics and with many well-known pretreating solutions.

The aqueous vapor is can be applied at temperatures from about 10° C. to about 120° C., more preferably from about 10° C. to about 60° C. At standard room conditions, steam will form at 100° C. and is included within the definition of aqueous vapor. Since some apparati capable of performing the methods of the present invention can attain pressures above atmospheric conditions, superheated steam is also included in the present definition of aqueous vapor. If the aqueous vapor does contain steam, it is preferred that the steam be what is known in the chemical arts as "low quality" or "wet" steam. The lipophilic fluid can be applied at temperatures from about 10° C. to about 100° C., more preferably from about 10° C. to about 60° C.

Although not intending to be bound by theory, it is believed that the reduction in risk of harm to fabrics is in part achieved to the relatively low levels of water used. In order for levels of water this low to be helpful in the cleaning process, an "as even as possible" distribution on the fabrics should occur without immersing the fabrics. It is believed that droplet size plays a role in the "evenness" of the distribution of fluid phases on the fabrics. As such, it is preferred that the aqueous vapor comprises droplets of less than about 1 millimeter in size, more preferably less than about 250 microns in size, and most preferably less than about 100 microns in size.

The methods of the present invention may occur in several places and do not require any specific single apparatus. For example, the entire process may be carried out manually. Alternatively, the aqueous vapor may be applied manually while the lipophilic fluid may be applied in an apparatus. Conversely, the steam may be applied within one apparatus while the lipophilic fluid is applied manually. Another alternative may be to utilize one apparatus for each of the application steps. Lastly, the entire method can occur within one apparatus or even within one cleaning chamber such as those found in a conventional domestic or industrial fabrics washer or dry cleaning machine.

The methods of the present invention may also include exposing the fabrics to adjunct materials such as builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, soil release polymers, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, sizing agents, anti-fade agents, and mixtures thereof.

It will be understood that the methods of the present invention may be combined with other fabric treatments. For example, prior to the application of the lipophilic fluid and/or aqueous vapor, the fabrics may be subjected to the particulate removal method described in co-pending application Ser. No. 60/191,965, to Noyes et al., filed Mar. 24, 2000, the relevant parts of which are incorporated herein by reference.

The present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the process of the present invention in addition to related processes.

The methods of the present invention may also be performed in an apparatus, which is not a modified existing apparatus but is one specifically built in such a manner so as to conduct the process of the present invention or may be added to another apparatus as part of a lipophilic fluid processing system. This would include all the associated plumbing, such as connection to a chemical and water supply, and sewerage for waste wash fluids.

The methods of the present invention may also be performed in an apparatus capable of "dual mode" functions. A "dual mode" apparatus is one capable of both washing and drying fabrics within the same drum. These apparati are commercially available, particularly in Europe.

An apparatus used to carry out the present invention will typically contain some type of control system. These include electrical systems, such as, the so-called smart control systems, as well as more traditional electromechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the apparatus of the present invention is only a part of a cleaning system, the so called "smart system" could be communicating with the other cleaning devices which would be used to complete the remainder of the cleaning process, such as a washing machine, and a dryer.

What is claimed is:

1. A method for cleaning fabrics within one apparatus comprising the steps of:
   a. applying an aqueous vapor to said fabrics, in an amount at least about 0.5% but less than or equal to about 50% by weight of said fabrics;
   b. applying a lipophilic fluid to said fabrics; and
   c. extracting at least a portion of said lipophilic fluid; wherein said lipophilic fluid comprises more than about 50% by weight of the lipophilic fluid of decamethylcyclopentasiloxane.

2. The method of claim 1 wherein said aqueous vapor is applied in an amount of at least about 5% by weight of said fabrics.

3. The method of claim 1 wherein said aqueous vapor is applied in an amount of less than or equal to about 15% by weight of said fabrics.

4. The method of claim 1 wherein said aqueous vapor is pulsed during said Step "a".

5. The method of claim 4 wherein said pulse continues for at least about 5 seconds.

6. The method of claim 4 wherein said pulse continues for at most about 30 seconds.

7. The method of claim 4 wherein a time interval separates each of said pulses.

8. The method of claim 7 wherein said lime interval is at least about 2 seconds.

9. The method of claim 7 wherein said time interval is at most about 20 seconds.

10. The method of claim 1 wherein said Step "a" occurs after said Step "b".

11. The method of claim 1 wherein said Step "a" occurs during or after said Step "c".

12. The method of claim 1 wherein said Step "a" occurs after said Step "c".

13. The method of claim 1 additionally comprising applying a surfactant to said fabrics.

14. The method of claim 1 additionally comprising applying an emulsifier to said fabrics.

15. The method of claim 1 wherein said lipophilic fluid comprises a member selected from the group consisting of a linear siloxane, octamethylcyclotetrasiloxane, dodecamethylcyclohexasiloxane, and mixtures thereof.

16. The method of claim 1 wherein said lipophilic fluid comprises an emulsifier.

17. The method of claim 1 wherein said lipophilic fluid comprises a surfactant.

18. The method of claim 1 wherein said lipophilic fluid is at a temperature from about 10° C. to about 100° C.

19. The method of claim 1 wherein said aqueous vapor comprises an emulsifier.

20. The method of claim 1 wherein said aqueous vapor comprises a surfactant.

21. The method of claim 1 wherein said aqueous vapor as at a temperature from about 10° C. to about 120° C.

22. The method of claim 1 wherein said aqueous vapor comprises wet steam.

23. The method of claim 1 wherein said aqueous vapor comprises cold steam.

24. The method of claim 1 wherein said aqueous vapor comprises droplets of less than about 1 millimeter in size.

25. The method of claim 1 wherein said aqueous vapor comprises droplets of less than about 250 microns in size.

26. The method of claim 1 wherein said aqueous vapor comprises droplets of less than about 100 microns in size.

27. The method of claim 1 wherein the entire method occurs within a cleaning chamber.

28. A method according to claim 1 wherein said extracting comprises spinning said fabrics and said lipophilic fluid.

29. A method according to claim 1 wherein said extracting comprises wringing said fabrics.

30. A method according to claim 1 wherein said extracting comprises evaporating at least a portion of said lipophilic fluid.

* * * * *